United States Patent
Sykes

(10) Patent No.: US 11,112,350 B2
(45) Date of Patent: Sep. 7, 2021

(54) METHOD FOR DETERMINING A STRENGTH OF A BOND AND/OR A MATERIAL AS WELL AS A BOND TESTER APPARATUS

(71) Applicant: XYZTEC B.V [NL/NL], Panningen (NL)

(72) Inventor: Robert John Sykes, Panningen (NL)

(73) Assignee: XYZTEC B.V. [NL/NL], Panningen (NL)

(*) Notice: Subject to any disclaimer, the term of this patent is extended or adjusted under 35 U.S.C. 154(b) by 343 days.

(21) Appl. No.: 15/781,771

(22) PCT Filed: Dec. 6, 2016

(86) PCT No.: PCT/NL2016/050850
§ 371 (c)(1),
(2) Date: Jun. 6, 2018

(87) PCT Pub. No.: WO2017/099590
PCT Pub. Date: Jun. 15, 2017

(65) Prior Publication Data
US 2018/0364151 A1  Dec. 20, 2018

(30) Foreign Application Priority Data
Dec. 7, 2015  (NL) ...................... 2015919

(51) Int. Cl.
*G01N 19/04* (2006.01)
*G01L 1/10* (2006.01)
*G01L 5/00* (2006.01)

(52) U.S. Cl.
CPC .............. *G01N 19/04* (2013.01); *G01L 1/106* (2013.01); *G01L 5/0028* (2013.01); *G01L 5/0057* (2013.01)

(58) Field of Classification Search
CPC ............................ G01L 1/106; G01L 5/0057
See application file for complete search history.

(56) References Cited

U.S. PATENT DOCUMENTS

| | | |
|---|---|---|
| 4,495,792 A | 1/1985 | Bai et al. |
| 5,526,697 A | 6/1996 | Tada et al. |
| 5,904,730 A | 5/1999 | Yamazaki et al. |
| 2005/0097964 A1 | 5/2005 | Fujii et al. |
| 2006/0231834 A1 | 10/2006 | Yeh et al. |
| 2008/0173104 A1 | 7/2008 | German |
| 2014/0305213 A1 | 10/2014 | Swanson et al. |

FOREIGN PATENT DOCUMENTS

| | | |
|---|---|---|
| EP | 0 407 413 B1 | 6/1992 |
| WO | 2008/003948 A1 | 1/2008 |

OTHER PUBLICATIONS

International Search Report for International Application No. PCT/NL2016/050850 dated Mar. 31, 2017.

*Primary Examiner* — Daniel S Larkin
(74) *Attorney, Agent, or Firm* — Suiter Swantz pc llo

(57) ABSTRACT

A method for testing a bond using a bond tester apparatus, the method comprising the steps of applying a mechanical force to the bond, determining, by a sensor component comprised by the bond tester apparatus, the applied force to the bond by measuring, by the sensor component, a displacement of the sensor component caused by the applied force and calculating, by the sensor component, the applied force on the basis of a first component which comprises a direct relationship with the measured displacement and on the basis of at least one of a second component, a third component and a fourth component.

7 Claims, 6 Drawing Sheets

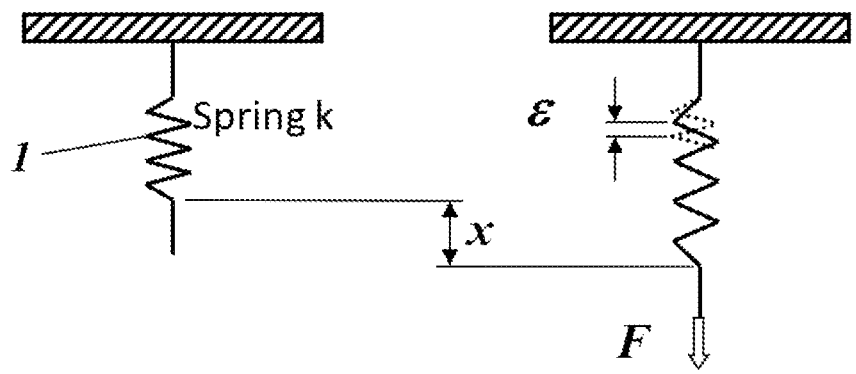
*Fig. 1 – prior art*
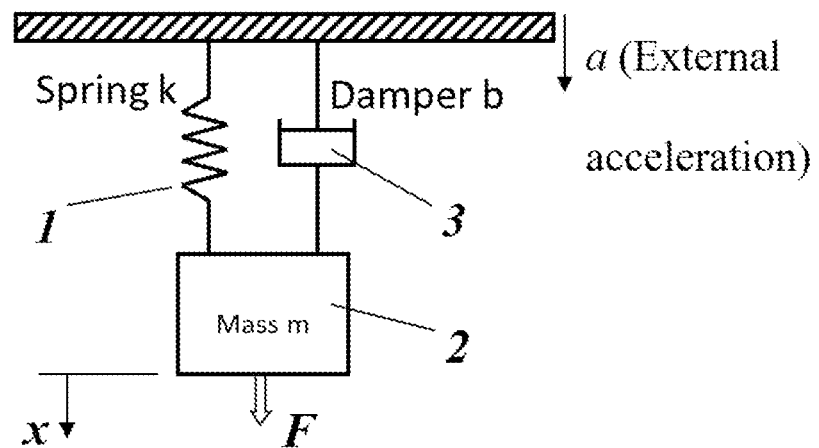
*Fig. 2*

$$m = \frac{k}{\frac{4\pi^2}{T^2} + \left(\frac{ln(x_1/x_{1+n})}{nT}\right)^2}$$

$$b = \frac{2m}{nT} ln(x_1/x_{1+n})|$$

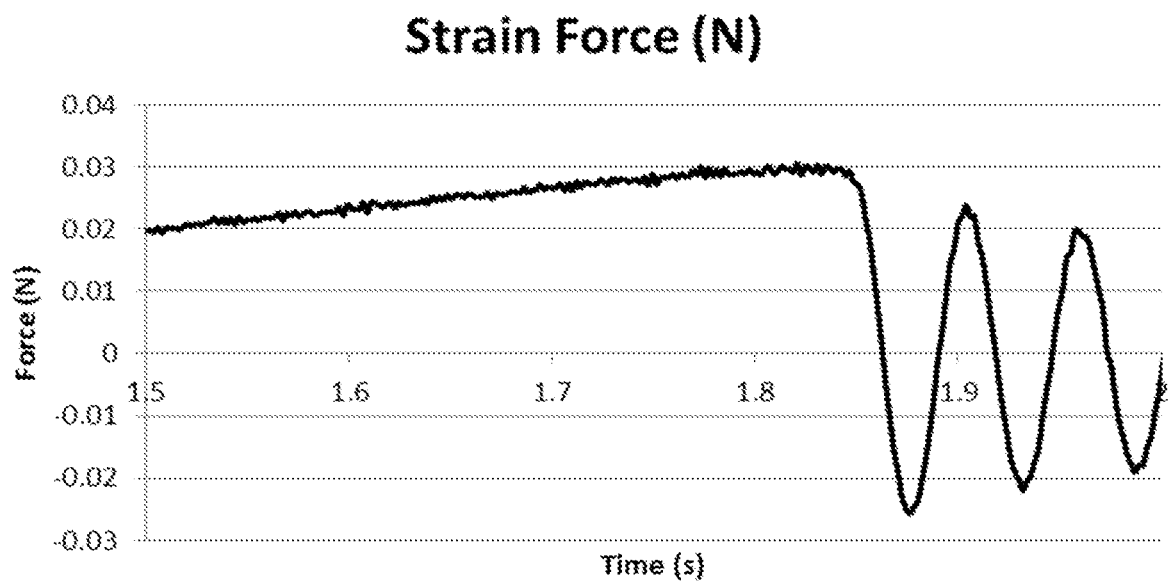
*Fig. 4 – prior art*
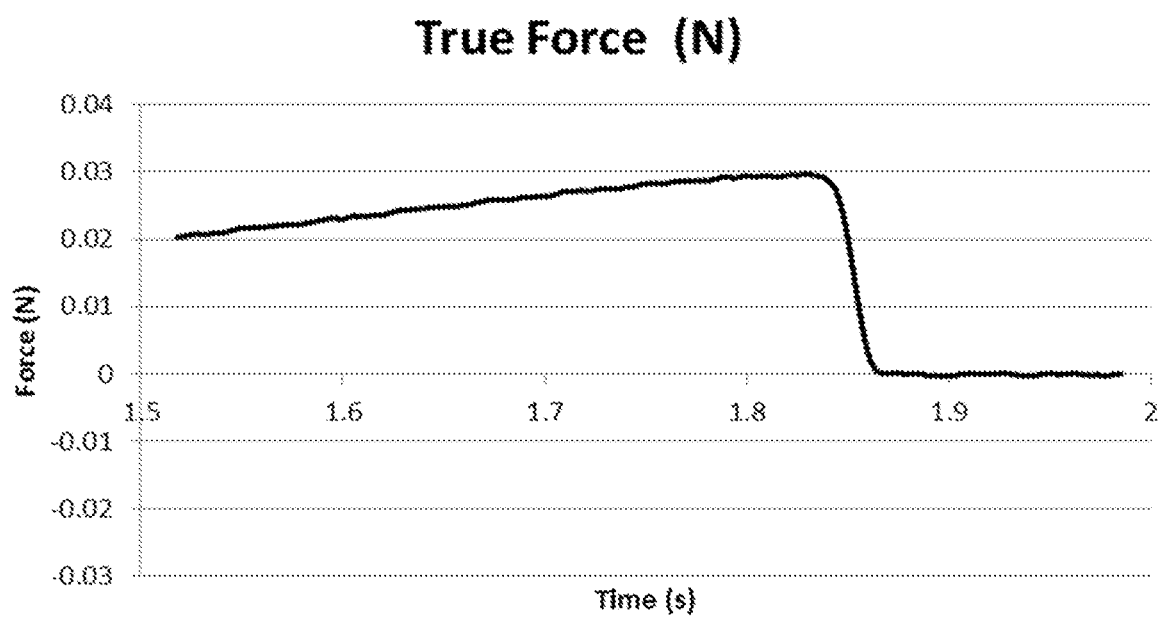
*Fig. 5*

METHOD FOR DETERMINING A STRENGTH OF A BOND AND/OR A MATERIAL AS WELL AS A BOND TESTER APPARATUS

SUMMARY

This invention is for a method of improving accuracy when measuring a force of changing magnitude where said force is measured by a change in a part of the sensors position which is a function of said force. It also provides a method that may reduce adverse effects, commonly referred to as "ringing" or "artefacts" when any type of signal is filtered.

BRIEF DESCRIPTION OF THE DRAWINGS

Features of the invention will be apparent from the following description with reference to the accompanying drawings in which:

FIG. 1 shows a schematic representation of a prior art sensor.

FIG. 2 shows a schematic representation of a sensor when applying the invention.

FIG. 4 shows an example of a sensor output using prior art when errors in the output can be clearly seen where the force changes rapidly. In this example the force increases slowly and is then rapidly removed. The errors being most evident where the force is removed.

FIG. 5 shows the same sensor output as in FIG. 4 where the errors have been substantially corrected by applying the method of the invention.

DETAILED DESCRIPTION

Figure 3:
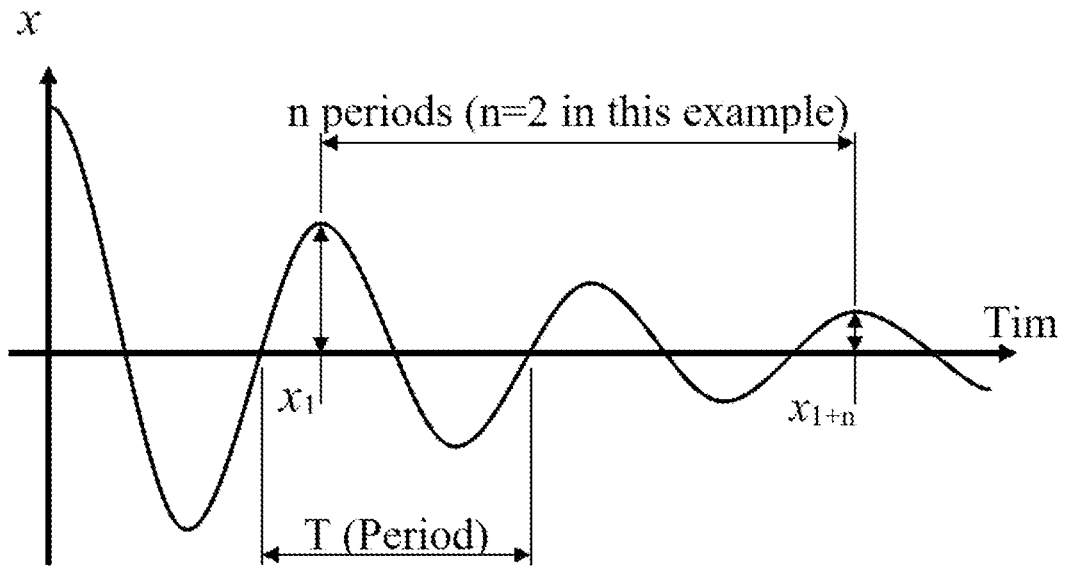
FIG. 3 shows the free body oscillation of a sensor when subjected to the sudden removal of a load application.

There are many forms of the prior art where an elastic element 1, illustrated as a spring, in FIG. 1 extends by deformation x or strain ε under the influence of load F. The extension of the element is then measured by some means and calibrated such that it can be used to measure the applied force. Means of measuring the deflection includes but is not limited to strain gauges as typically used on a load cell, laser distance measuring sensors and capacitive or inductive distance measuring sensors. In a simple case the extension may be considered proportional to the force such that a calibration coefficient k is used to convert the extension into the force measurement. In more complex systems the calibration can also include none linear relationships between the force and extension.

Assuming a linear relationship the equations used to convert extension into a force measurement are, $F \propto x$ $F = kx$ Or, $F \propto \varepsilon$ $F = k\varepsilon$ Whilst the elastic element is very often an elastic material that stretches, compresses, or bends it can be anything with elastic like properties for example a magnetic or electrostatic field. In the case of elastic materials the extension is often measured by detecting the strain e at some part of the elastic element.

FIG. 1 is a model used to relate the extension to the force. A problem exists with this model because it does not take into account other properties in a sensor that may influence the force independent of the extension alone. A more complete model and part of the invention is shown in FIG. 2, where the moving part of the sensor has mass and the extension is subject to damping forces as well as the elastic force. The damping and extension coefficients being b and k respectively. This model is often known as a "spring mass damper model". Whilst the model is known its application in the method of the invention is new.

The present invention is applicable to Bond Testing and Materials Testing.

In addition the possible acceleration "a" of the sensor mount is taken into account. Applying a load sometimes requires the sensor to be moved relative to the subject being measured. This movement can have accelerations on m that then cause a sensor output even when no load is applied.

A more accurate calculation of the force is then, $$F = kx + b\frac{dx}{dt} + m\frac{d^2x}{dt^2} - ma$$

The force at any point in time is then the sum of that required to produce the extension, velocity and accelerations of the moving part of a sensor. As sensors sometimes have a complex movement the motion of the moving part might include rotations as well as linear movement. Extension x may also be measured as a strain ε. This is of no matter since the calibration of the three coefficients k, b and m are derived from an output equivalent to x and the coefficients then also become equivalent. The units of x, k, b and m which are assumed to be due to linear motion are then consistent and enable an accurate calculation of F from a knowledge of k, b, m and how x changes in time.

As x changes in time the first and second differentials dx/dt (velocity) and $d^2x/dt^2$ (acceleration) can be calculated.

The calibration of k can be done under static loading conditions. Coefficients b and m can be calculated using k and the free body oscillation characteristic of the sensor as shown in FIG. 3, illustrating of the sensors free body oscillation and the expressions for m and b. Calculating or calibrating m and b is not essential. Estimates could, for example, be substituted into the calculation of F by trial and error to reduce the "ringing" of the sensor as will be shown and discussed later and in FIGS. 4, 5, 6 and 7.

The conventional model in FIG. 1 assumes the system in not affected by the first and second order differentials of x and acceleration "a". Its calibration and its use assumes the sensor is in a static or steady state. The more precise model in FIG. 2 takes into account the first and second order differentials of x together with "a" and its calibration is dynamic. It is not essential to apply all of the dynamic terms in the application of the invention. The effect of any one of the differential terms or acceleration "a" might be considered negligible. In such cases only the terms considered significant might be applied.

An illustration of the benefit of the invention can be seen when the force being measured changes rapidly. In a conventional calibration applying only the extension and constant k the sensor output will indicate a false oscillating load. This is sometimes referred to a "ringing". One specific example is a steady force that is instantly removed. Instead of showing the force as constant and then dropping immediately to zero, the output will oscillate around zero. This is to a large extent due to the mass m of the sensor bouncing about the elastic element. This continues slowly reducing under the influence of damping b.

An additional use of the invention is to reduce filter artefacts in any signal. Signals often include noise and it is beneficial to filter this out. Filtering though can produce artefacts that can behave very similarly to the dynamic influence on damping and mass. This is also known as ringing. In such cases the calibration of the dynamic effective terms of b and m will include the filters influence on the first and second order differentials and applying these effective constants will then reduce the filter ringing artefacts. The units of m and b may no longer be that of mass and damping but depend on the nature of the signal. They are though the first and second order differentials. m and b can again be measured by the signals response to a sudden change or "step input".

In a preferred embodiment the dynamic calibration is applied to sensors used on a Bond Tester. Bond testers are known in the semiconductor and electronics industry as a measurement tool to determine the strength of the many different types of bonds used in the construction of complex products. Such bonds are often electrically conductive, such as gold or aluminium wire bonds between microchips and substrates or solder interconnects, but may also be thermal bonds such as between a silicon die and a substrate. The geometry of such bonds varies from a few micrometres to tens of millimetres.

For example power transistors of electric vehicles may have a planar bond of 50 mm2 or more, whereas semiconductor devices may have bonds of less than 10 μm2. Applied loads may range from a few grams force to a few hundreds of kilograms force, and different sizes and configurations of test machine are provided according to the components to be tested.

FIG. 4 is a real example of part of the sensor force measurement without the application of dynamic calibration from a bond tester testing the strength of a wire bond to destruction. The load can be seen to increase up to a point of failure after which the sensor output oscillates even though the force is then zero. FIG. 5 shows the exact same sensor output but with the correction for the damping and mass terms. As can be seen at failure the force now fall rapidly to substantially zero. The strength of the bond is taken as the maximum force measured and not taking into account the dynamic characteristics of the sensor will have an effect on this. The extent of the effect depends on the sensor, sample and test speed. It can be a small fraction of the maximum force recorded or a very significant proportion. As a rough guide in numerical terms errors of 0.05% can occur at test speeds of 0.1 mm/s and up to 45% at 5 mm/s.

Figure 6:
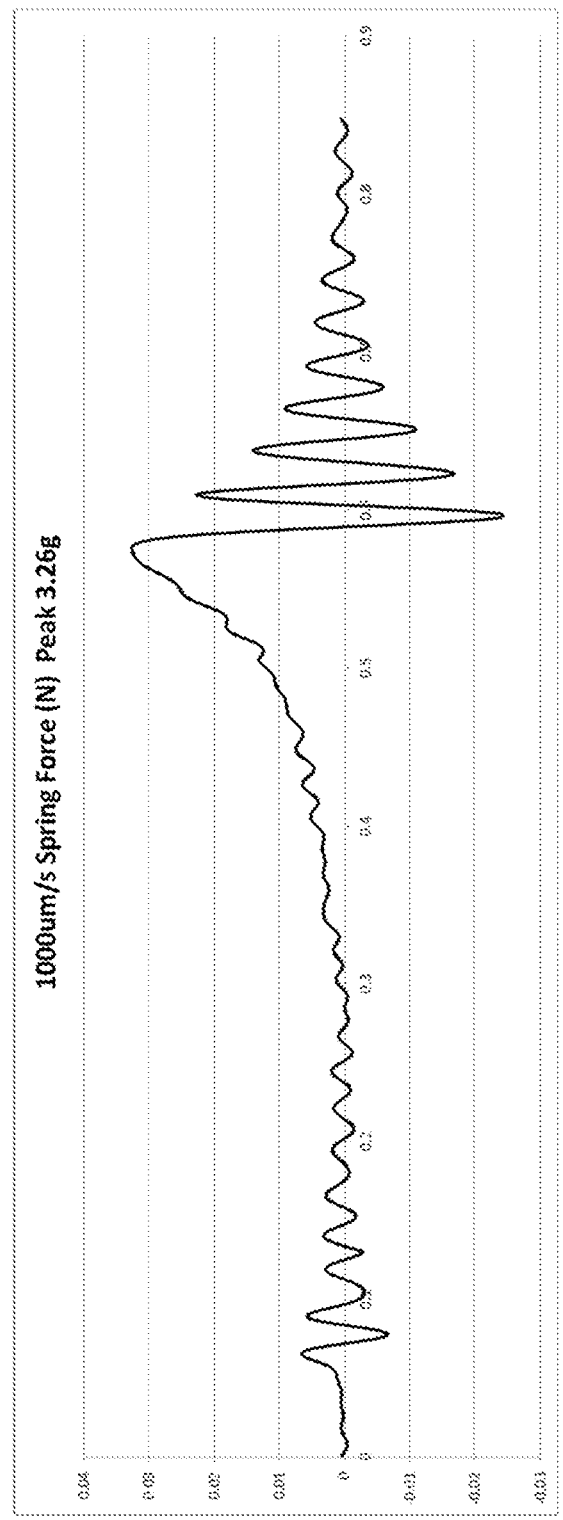
FIG. 6 shows another example of a sensor output using prior art when errors in the output can be clearly seen. This example is similar to that in FIG. 4 but in this case the force is applied more rapidly.
Figure 7:
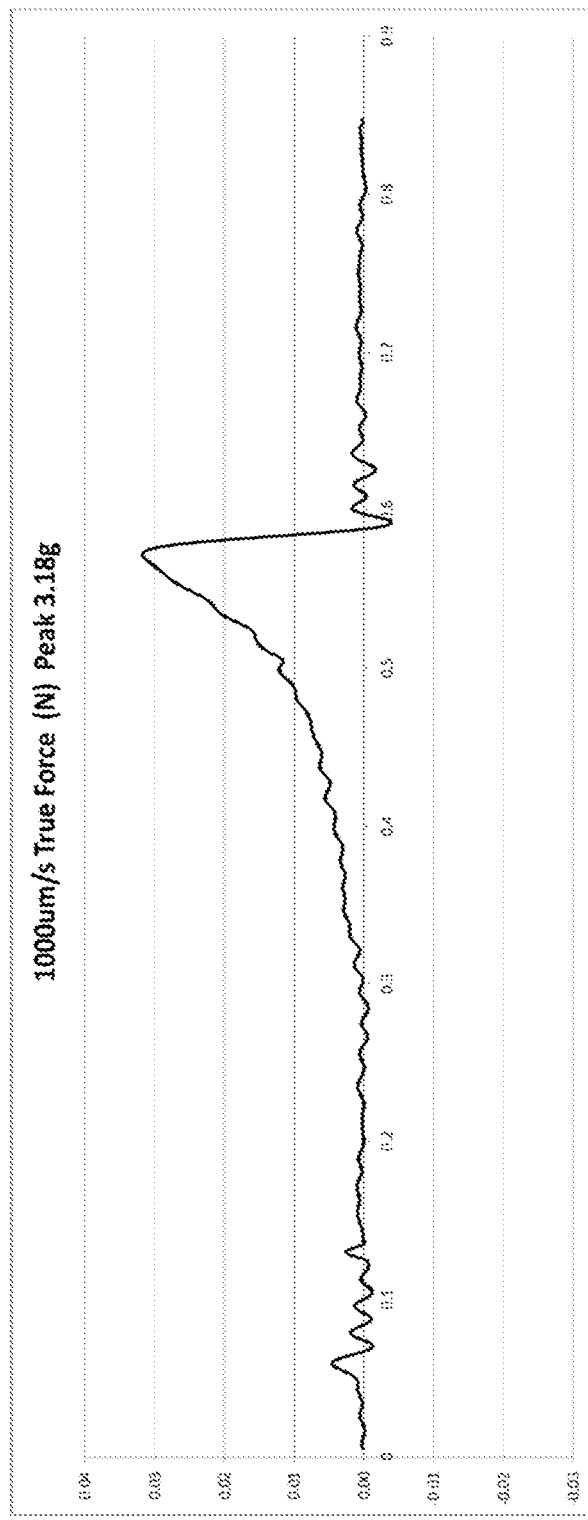
FIG. 7 shows the same sensor output as in FIG. 6 where the errors have been substantially corrected by applying the method of the invention. However, because the time base is faster that that shown in the example in FIG. 5, errors in the correction become more significant.

FIG. 6 is another real example of a sensor force measurement for a complete test without the application of dynamic calibration. Oscillations are again seen. FIG. 7 shows the exact same sensor output but with the correction for the damping and mass terms. It can be seen that the oscillations are again significantly reduced. The reduction occurs after the peak force where the wire broke but also during the beginning of load application before the sensor comes into contact with the wire and is free to oscillate under the acceleration forces "a" cause by moving the sensor to the wire and to a lesser extent as the force rises. The oscillation are reduced but not eliminated. This is because the invention is an improved but still imperfect model of the real sensor. In this example the test result, or peak force, was 3.26 gf and 3.18 gf without dynamic calibration and with dynamic calibration respectively. The 3.18 gf being more accurate indicates an error in the order of 2.5% without the application of dynamic calibration.

Figure 8:
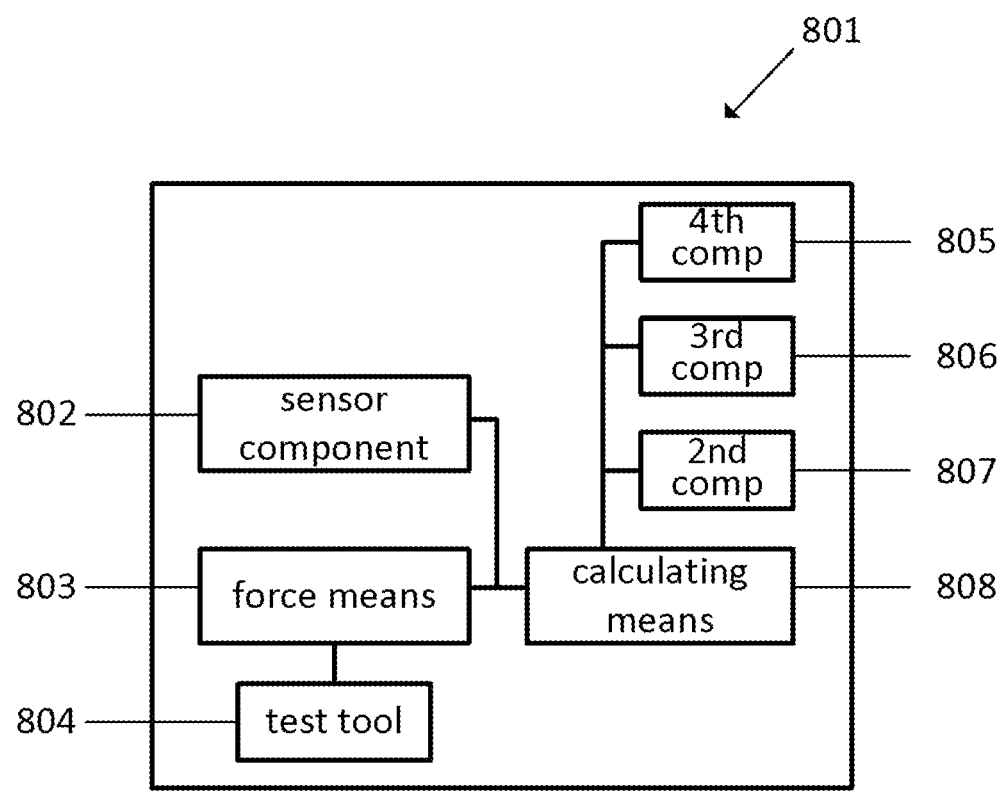
FIG. 8 shows a block diagram of a bond testing apparatus according to the present invention.

FIG. 8 discloses a bond testing apparatus according to the present invention. The bond testing apparatus 801 is arranged for determining a strength of a bond and/or a material, said bond testing apparatus 801 comprising:
  force means 803 arranged for applying, via a test tool 804 comprised by said bond tester apparatus 801, a mechanical force to said bond;
  a sensor component 802 arranged for measuring a displacement of said sensor component 802 caused by said applied force;
  calculating means 808 arranged for calculating said applied force on the basis of a first component which comprises a direct relationship with said measured displacement and on the basis of at least one of
    a second component 807 which comprises a direct relationship with a first derivative of said measured displacement over time;
    a third component 806 which comprises a direct relationship with a second derivative of said measured displacement over time;
    a fourth component 805 which comprises a direct relationship with an acceleration of said sensor component over time.

The invention claimed is:

1. A method for performing an application of force on a bond, comprising the steps of:
  applying, using a test tool comprising a bond tester apparatus, a mechanical force to the bond;
  determining, by a sensor component of the bond tester apparatus, the applied force to the bond by:
  measuring, by the sensor component, a displacement of the sensor component caused by the applied force; and
  calculating, by the sensor component, the applied force on the basis of a first component which comprises a direct relationship with the measured displacement and on the basis of at least one of:
    a second component which comprises a direct relationship with a first derivative of the measured displacement over time;
    a third component which comprises a direct relationship with a second derivative of the measured displacement over time; and
    a fourth component which comprises a direct relationship with an acceleration of the sensor component;
  wherein the first component comprises a spring coefficient times the measured displacement; and
  wherein the spring coefficient is related to a constant characteristic of the sensor component.

2. The method according to claim 1, wherein:
  the applied force is calculated on the basis of at least the second component;

the second component comprises a damping coefficient times the first derivative of the measured displacement over time; and the damping coefficient is related to damping and elastic forces of the sensor component.

3. The method according to claim 2, further comprising the step of:

determining the damping coefficient using a free-body oscillation characteristic of the sensor component.

4. The method according to claim 1, wherein:

the applied force is calculated on the basis of at least the third component;

the third component comprises a mass coefficient times the second derivative of the measured displacement over time; and the mass coefficient is related to a mass of the sensor component.

5. The method according to claim 4, further comprising the step of:

determining the mass coefficient using a free-body oscillation characteristic of the sensor component.

6. The method according to claim 1, further comprising the step of:

determining the spring coefficient by applying a static force to the bond.

7. The method according to claim 1, wherein the applied force is calculated based on the equation:

$$F = kx + b\frac{dx}{dt} + m\frac{d^2x}{dt^2} - ma,$$

wherein:

F is the applied force, k is the spring coefficient, x is the measured displacement, b is a damping coefficient, m is a mass coefficient, t is the time, and a is the acceleration of the sensor component.

* * * * *